(12) United States Patent
Hanson et al.

(10) Patent No.: US 12,199,415 B2
(45) Date of Patent: Jan. 14, 2025

(54) LINE PULLER SYSTEMS AND DEVICES

(71) Applicant: Sherman + Reilly, Inc., Chattanooga, TN (US)

(72) Inventors: Tim Hanson, Chattanooga, TN (US); Nathan Russell, Chattanooga, TN (US); Reginald Jones, Chattanooga, TN (US); Robert Post, Chattanooga, TN (US); Erik Bracker, Chattanooga, TN (US)

(73) Assignee: Sherman + Reilly, Inc., Chattanooga, TN (US)

( * ) Notice: Subject to any disclaimer, the term of this patent is extended or adjusted under 35 U.S.C. 154(b) by 233 days.

(21) Appl. No.: 17/702,091

(22) Filed: Mar. 23, 2022

(65) Prior Publication Data
US 2022/0311226 A1    Sep. 29, 2022

Related U.S. Application Data

(60) Provisional application No. 63/165,679, filed on Mar. 24, 2021.

(51) Int. Cl.
*H02G 1/04* (2006.01)
*B65H 59/18* (2006.01)
*H02G 1/08* (2006.01)

(52) U.S. Cl.
CPC .............. *H02G 1/04* (2013.01); *B65H 59/18* (2013.01); *H02G 1/081* (2013.01)

(58) Field of Classification Search
CPC ........ B65H 59/18; B65H 51/00; H02G 1/081; H02G 1/08; H02G 1/04; H02G 1/085;
(Continued)

(56) References Cited

U.S. PATENT DOCUMENTS

| | | | | |
|---|---|---|---|---|
| 3,912,229 A | * | 10/1975 | Mitchell | B66D 1/08 |
| | | | | 254/311 |
| 4,018,424 A | * | 4/1977 | Latimer | B66D 1/16 |
| | | | | 74/473.11 |

(Continued)

OTHER PUBLICATIONS

Sauber—Model 1510-B Reel Trailer, accessed via https://saubermfg.com/trailer/model-1510-b-reel-trailer/ (Mar. 23, 2021).

*Primary Examiner* — Steven M Cernoch
*Assistant Examiner* — Kent N Shum
(74) *Attorney, Agent, or Firm* — Troutman Pepper Hamilton Sanders LLP; Ryan A. Schneider; Korbin M. Blunck

(57) ABSTRACT

The disclosed technology includes a line pulling system that may include an engagement assembly, which may include an engagement cable configured to be pushed or pulled. The assembly may also include a cable mounting assembly connected to the support member and the engagement cable, a hinged linkage connected to the support member and the engagement cable and configured to partially rotate in response to a push or pull from the engagement cable, an engagement arm connected to the hinged linkage and configured to move according to the rotation motion of hinged linkage, a coupling ring connected to the engagement arm and configured to transition between an engaged position and a disengaged position in response to movement from the engagement arm.

10 Claims, 16 Drawing Sheets

DETAIL C

(58) Field of Classification Search
CPC . H02G 1/06; H02G 1/083; H02G 3/22; B66D 5/26; B66D 1/08; B66D 1/16; F16D 3/06; F16D 1/02; F16D 2001/102; F16D 2011/004; F16D 11/10; F16D 28/00; F16D 2011/006; F16D 2001/103; Y10T 403/7035; Y10T 74/2042; F16C 1/10
See application file for complete search history.

(56) References Cited

U.S. PATENT DOCUMENTS

| | | | | |
|---|---|---|---|---|
| 4,382,581 | A | * | 5/1983 | Wimer ............... H02G 9/10 |
| | | | | 254/134.3 FT |
| 5,228,656 | A | | 7/1993 | Sauber |
| 5,474,278 | A | * | 12/1995 | Cleveland ............ B66D 1/08 |
| | | | | 254/358 |

* cited by examiner

SECTION A-A

DETAIL C

DETAIL D

SECTION B-B

DETAIL F

DETAIL E

LINE PULLER SYSTEMS AND DEVICES

CROSS-REFERENCE TO RELATED APPLICATIONS

This application claims benefit under 35 USC § 119(e) of U.S. Provisional Patent Application No. 63/165,679 filed 24 Mar. 2021, the entirety of which is incorporated herein by reference as if set forth herein in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The disclosed technology relates generally to systems and devices used for pulling and winding lines; and, more specifically, to systems and devices for pulling and winding lines used in the electrical utility industry.

2. Description of Related Art

Line pulling and winding equipment is a vital tool in the utility industry. Such equipment can be used to manipulate wires, ropes, cables, and other materials (collectively, "lines") during installation (e.g., installing new utility lines) and/or reconductoring (e.g., pulling a new conductor through an old utility line). Typically, line pulling equipment can include a puller machine located at one end of a stretch of utility line and a tensioner located at the opposite end of the stretch of the utility line. When installing or reconductoring a stretch of utility line, the puller typically pulls the line through sets of sheaves (often referred to as "pulleys" or "blocks") that are attached to power poles while the tensioner controls a tension applied to the line as it is fed from a spool. In certain examples, utility lines can extend for long distances, greatly increasing the forces and stresses on the line pulling equipment.

There a several problems with existing line pulling equipment. The large forces and stresses exerted on the line pulling equipment can pose a severe risk to an operator and/or other user of the line pulling equipment. The energy stored in lines under tension suddenly being released due to a failure can cause severe injury to those in the immediate area as the line whips back toward the puller. Existing line pulling equipment requires inefficient manual engagement of each individual line pulling drums and is unreliable in maintaining engagement with drums thereby increasing risk of injury to workers. They do this by using cab levers to lock engagement systems onto a drum. Additionally, existing line pulling equipment is unable to reliably pull two or more lines at any given time due to one or more lines becoming misaligned on its associated drum causing a drum to reduce its line holding capacity or safety risk associated with crossing one line with another line. These systems effectively put two ropes into opening making it extremely risky that lines will cross.

All of the aforementioned problems increase risks when operating current line pulling equipment and cause inefficiencies. The intense stresses and forces can break lines and equipment and can damage surrounding structures and injure workers. These and other problems are addressed by examples of the technology disclosed herein.

SUMMARY

Examples of the present disclosure can include an engagement assembly capable of improving the reliability of the engagement between a line pulling drum and a motor in a line pulling system with minimal effort from an operator. The new assembly utilizes uses an over-center design which further ensures positive lock with the drum. This provides redundancy lock rather than just relying on the lever itself.

Examples of the present disclose can include a level wind head capable of improving reliability in pulling two or more lines by utilizing well placed side rollers, sheaves, and actuated via a hydraulic arm to ensure alignment with respect to line previously wound on a drum. The disclosed level wind head may include openings or windows, among other features that provides better control of each rope while eliminating ropes coming in contact with one another or tangling. The level wind head design allows for the operator to utilize one to four (or more) (side by side and/or front to back) drums at a time while being able to manage how the rope is being laid on the drum without the risk of ropes coming in contact with each other. If the level wind heads becomes out of sync with each other, an internal valve, resyncs the level wind heads to at the end of stroke.

In some examples, two level wind heads may be synchronized with each other via hydraulics.

One general aspect includes an engagement assembly. The engagement assembly also includes a support member. The assembly also includes an engagement cable configured to be pushed or pulled in response movement of the engagement level of the control console. The assembly also includes a cable mounting assembly connected to the support member and the engagement cable. The assembly also includes a hinged linkage connected to the support member and the engagement cable and configured to partially rotate in response to a push or pull from the engagement cable. The assembly also includes an engagement arm connected to the hinged linkage and configured to move according to the rotation motion of hinged linkage. The assembly also includes a coupling ring connected to the engagement arm and configured to transition between an engaged position and a disengaged position in response to movement from the engagement arm, where, when in the engaged position, the coupling ring is configured to couple to a drum core to cause a torque applied by a motor to be transferred to the drum core, and where, when in the disengaged position, the coupling ring is configured to uncouple from the drum core.

Implementations may include one or more of the following features. The engagement assembly where, when in the engaged position, a first end of the engagement arm and a second end of the hinged linkage are off center of a center of the coupling ring. When in the disengaged position, at least a first end of the engagement arm and a first end of the hinged linkage are off center of the coupling ring. The hinged linkage is hinged at a first end connected to the support member and a second end connected to the engagement arm. The engagement arm is hinged at a first end connected to the hinged linkage and a second end connected to the coupling ring. The coupling ring further may include one or more protrusions configured to connect with the one or more corresponding receptacles of the drum core when in the engaged position. The engagement assembly may include one or more support arms coupled to sides of the support member and the coupling ring and configured to align the coupling ring with the drum core. The one or more support arms are hinged with respect to the support member and the coupling ring.

One general aspect includes a line pulling system. The line pulling system also includes a chassis configured to support one or more drums, the one or more drums being configured to receive one or more lines. The system also includes a motor configured to rotate the one or more drums in a first direction to cause the one or more lines to wind around the one or more drums and in a second direction to facilitate removal of the one or more lines from the one or more drums. The system also includes a control console configured to control the one or more engagement assemblies. The system also includes one or more engagement assemblies, each may include: a support member; an engagement cable configured to be pushed or pulled in response to movement of an engagement level of the control console; a cable mounting assembly connected to the support member and the engagement cable; a hinged linkage connected to the support member and the engagement cable and configured to partially rotate in response to a push or pull from the engagement cable; an engagement arm connected to the hinged linkage and configured to move according to the rotation motion of hinged linkage; a coupling ring configured to transition between an engaged position and a disengaged position, where, when in the engaged position, the coupling ring is configured to couple the motor to a drum of the one or more drums to cause a torque applied by the motor to be transferred to the drum, and where, when in the disengaged position, the coupling ring is configured to uncouple the motor from the drum.

Implementations may include one or more of the following features. The line pulling system where, when in the engaged position, the engagement arm and the hinged linkage are aligned with a center of the coupling ring. When in the disengaged position, at least as first end of the engagement arm and a first end of the hinged linkage are off center of the coupling ring. The hinged linkage is hinged at a first end connected to the support member and a second end connected to the engagement arm. The engagement arm is hinged at a first end connected to the hinged linkage and a second end connected to the coupling ring. The coupling ring further may include one or more protrusions configured to connect with the one or more corresponding receptacles of the drum core when in the engaged position. Each engagement assembly further may include one or more support arms coupled to sides of the support member and the coupling ring and configured to align the coupling ring with the drum core. The one or more support arms are hinged with respect to the support member and the coupling ring.

One general aspect includes a line pulling system. The line pulling system also includes at least two drums. The system also includes a chassis configured to support the at least two drums, the at least two drums being configured to receive at least two lines. The system also includes a motor configured to rotate the at least two drums in a first direction to cause the at least two lines to wind around the at least two drums and in a second direction to facilitate removal of the at least two lines from the at least two drums. The system also includes a first level wind head may include: a level wind support connected to the chassis; at least two rotating sheaves connected to the level wind support and configured to guide the at least two lines to and from the at least two drums by rotating about a first axis; a first set of rollers connected to the level wind support, positioned proximate the at least two drums, and configured to rotate about a second axis different from the first axis. The system also includes a hydraulic arm connected to the level wind head and the chassis and configured to move the first level wind head approximately laterally as the at least two lines are wound around the at least two drums.

Implementations may include one or more of the following features. The line pulling system may include: one or more engagement assemblies, each may include: a support member; an engagement cable configured to be pushed or pulled in response to movement of the engagement level of the control console; a cable mounting assembly connected to the support member and the engagement cable; a hinged linkage connected to the support member and the engagement cable and configured to partially rotate in response to a push or pull from the engagement cable; an engagement arm connected to the hinged linkage and configured to move according to the rotation motion of hinged linkage; a coupling ring configured to transition between an engaged position and a disengaged position, where, when in the engaged position, the coupling ring is configured to couple the motor to a drum of the at least two drums to cause a torque applied by the motor to be transferred to the drum, and where, when in the disengaged position, the coupling ring is configured to uncouple the motor from the drum. The line pulling system may include: a control console configured to: set the one or more engagement assemblies into the engaged position and the disengaged position; and move the hydraulic arm. The one or more support arms are hinged with respect to the support member and the coupling ring, and where the coupling ring may include an alignment arm connected to the engagement arm and configured to be located over a center of a first end of the hinged linkage when in the engaged position.

DETAILED DESCRIPTION

Figure 1A:
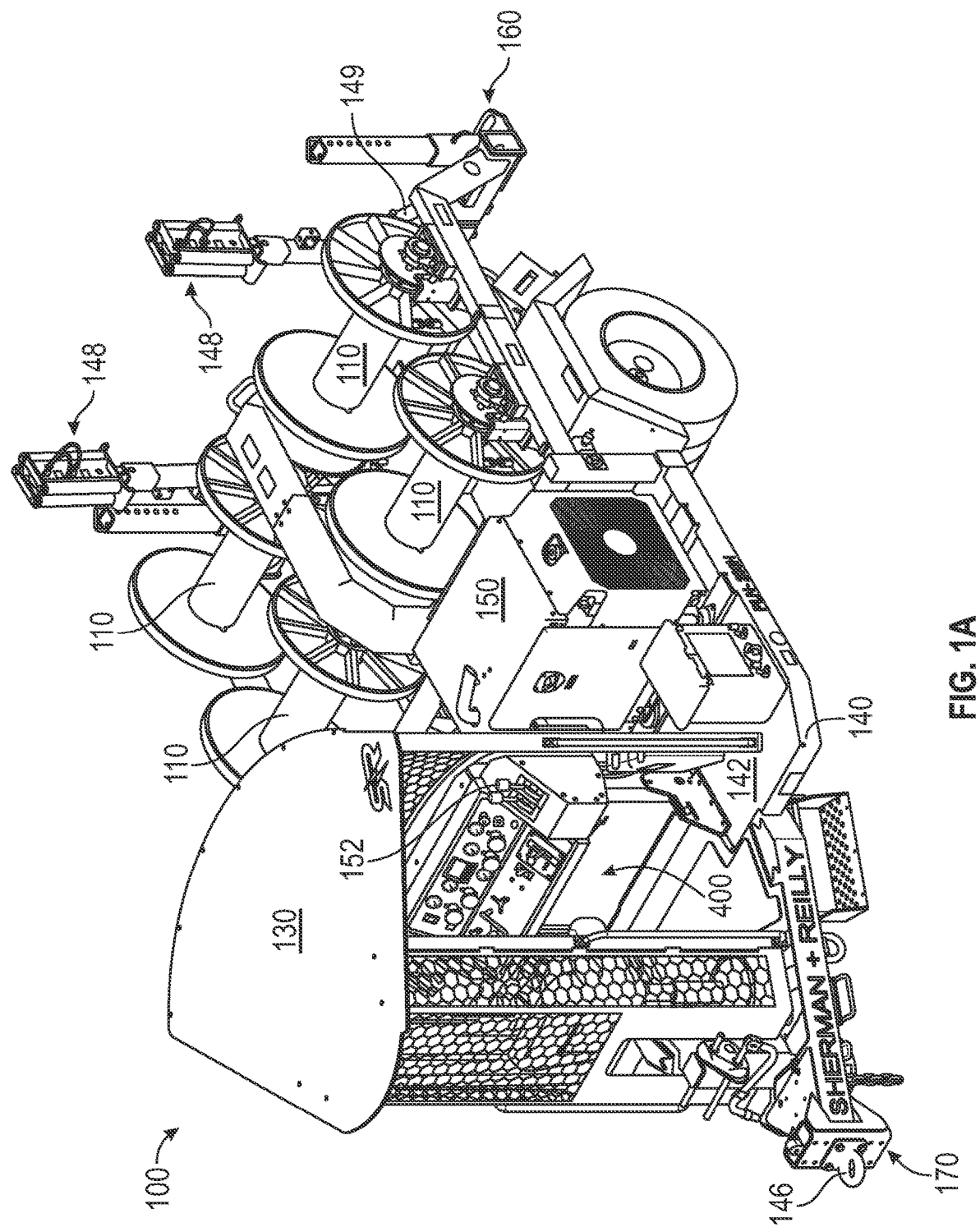
FIG. 1A is a front, perspective view of an example of a line pulling system, in accordance with some examples of the present disclosure.

Examples of the present disclosure can include a line pulling assembly with an engagement assembly capable of improving the reliability of the engagement between a line pulling drum and a motor with minimal effort from an operator and a level wind head capable of improving reliability in pulling two or more lines by utilizing well placed side rollers, sheaves, and actuated via a hydraulic arm to ensure alignment with respect to line previously wound on a drum.

For ease of explanation, the system is discussed below with reference to stringing and supporting power and communications lines. One of skill in the art will recognize, however, that the system is not so limited. Indeed, the system could be used in any number of industries where ropes, support cables (e.g., for ski lifts), communications cables, wires, and other similar products need to be efficiently installed and supported. Thus, the description below is intended to be illustrative and not limiting.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. In other words, the terms "a," "an," and "the" do not denote a limitation of quantity, but rather denote the presence of "at least one" of the referenced item.

As used herein, the term "and/or" may mean "and," it may mean "or," it may mean "exclusive-or," it may mean "one," it may mean "some, but not all," it may mean "neither," and/or it may mean "both." The term "or" is intended to mean an inclusive "or."

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose. It is to be understood that examples of the disclosed technology may be practiced without these specific details. In other instances, well-known methods, structures, and techniques have not been shown in detail in order not to obscure an understanding of this description.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value. Further, the term "about" means within an acceptable error range for the particular value as determined by one of ordinary skill in the art, which will depend in part on how the value is measured or determined, i.e., the limitations of the measurement system. For example, "about" can mean within an acceptable standard deviation, per the practice in the art. Alternatively, "about" can mean a range of up to ±20%, preferably up to ±10%, more preferably up to ±5%, and more preferably still up to ±1% of a given value. Alternatively, the term can mean within an order of magnitude, preferably within 2-fold, of a value. Where particular values are described in the application and claims, unless otherwise stated, the term "about" is implicit and in this context means within an acceptable error range for the particular value.

Throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Throughout this description, various components may be identified having specific values or parameters, however, these items are provided as exemplary embodiments. Indeed, the exemplary embodiments do not limit the various aspects and concepts of the present disclosure as many comparable parameters, sizes, ranges, and/or values may be implemented. The terms "first," "second," and the like, "primary," "secondary," and the like, do not denote an order, quantity, or importance, but rather are used to distinguish one element from another.

It is noted that terms like "specifically," "preferably," "typically," "generally," and "often" are not utilized herein to limit the scope of the claimed disclosure or to imply that certain features are critical, essential, or even important to the structure or function of the claimed disclosure. Rather, these terms are merely intended to highlight alternative or additional features that may or may not be utilized in a particular embodiment of the present disclosure. It is also noted that terms like "substantially" and "about" are utilized herein to represent the inherent degree of uncertainty that may be attributed to any quantitative comparison, value, measurement, or other representation.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials and/or components described hereinafter as making up the various elements of the present disclosure are intended to be illustrative and not restrictive. Many suitable materials and/or components that would perform the same or a similar function as the materials and/or components described herein are intended to be embraced within the scope of the disclosure. Such other materials and/or components not described herein can include, but are not limited to, materials and/or components that are developed after the time of the development of the disclosure, for example. Any dimensions listed in the various drawings are for illustrative purposes only and are not intended to be limiting. Other dimensions and proportions are contemplated and intended to be included within the scope of the disclosure.

Figure 1B:
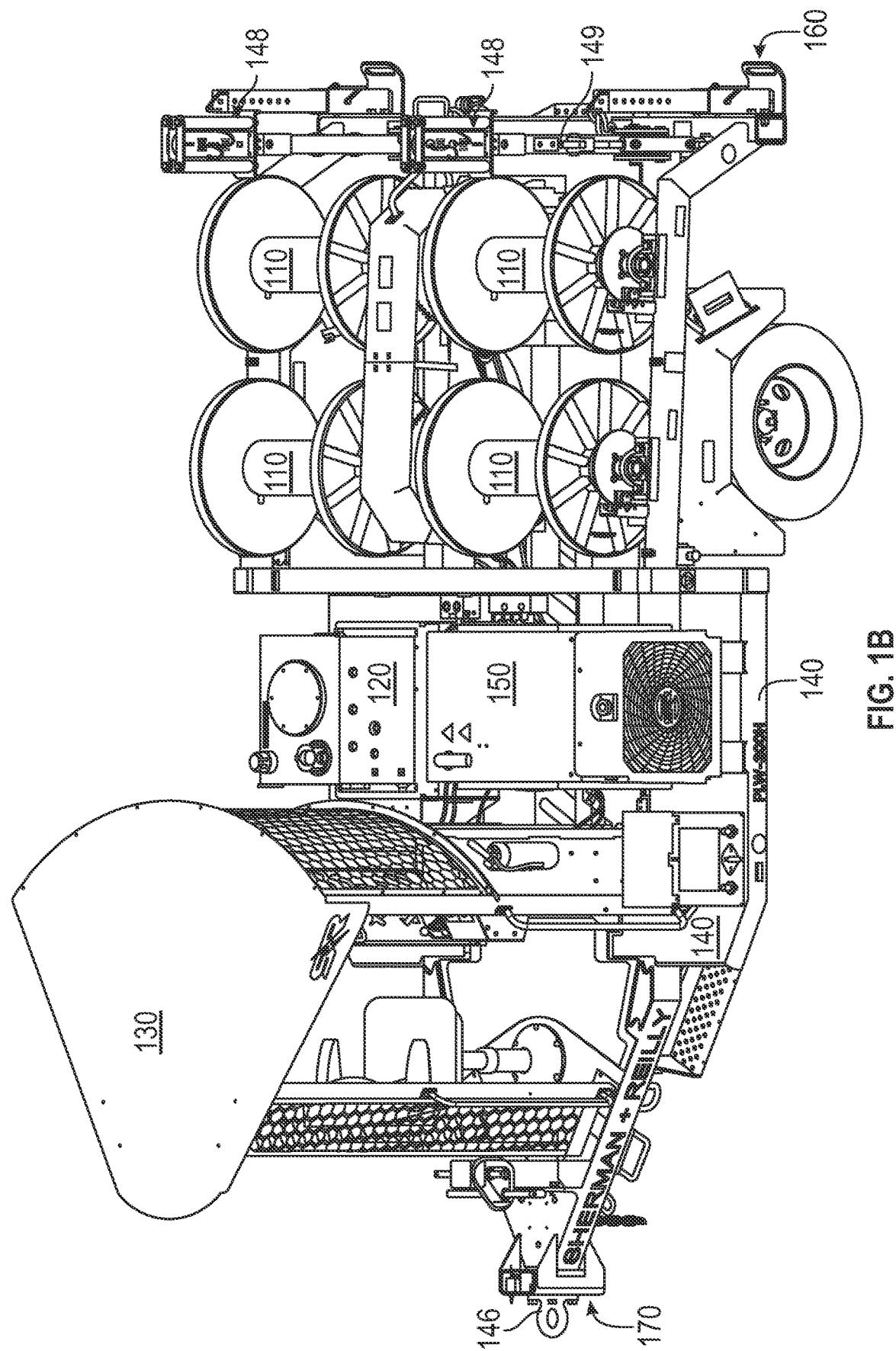
FIG. 1B is a side, perspective view of an example of a line pulling system, in accordance with some examples of the present disclosure.
Figure 1C:
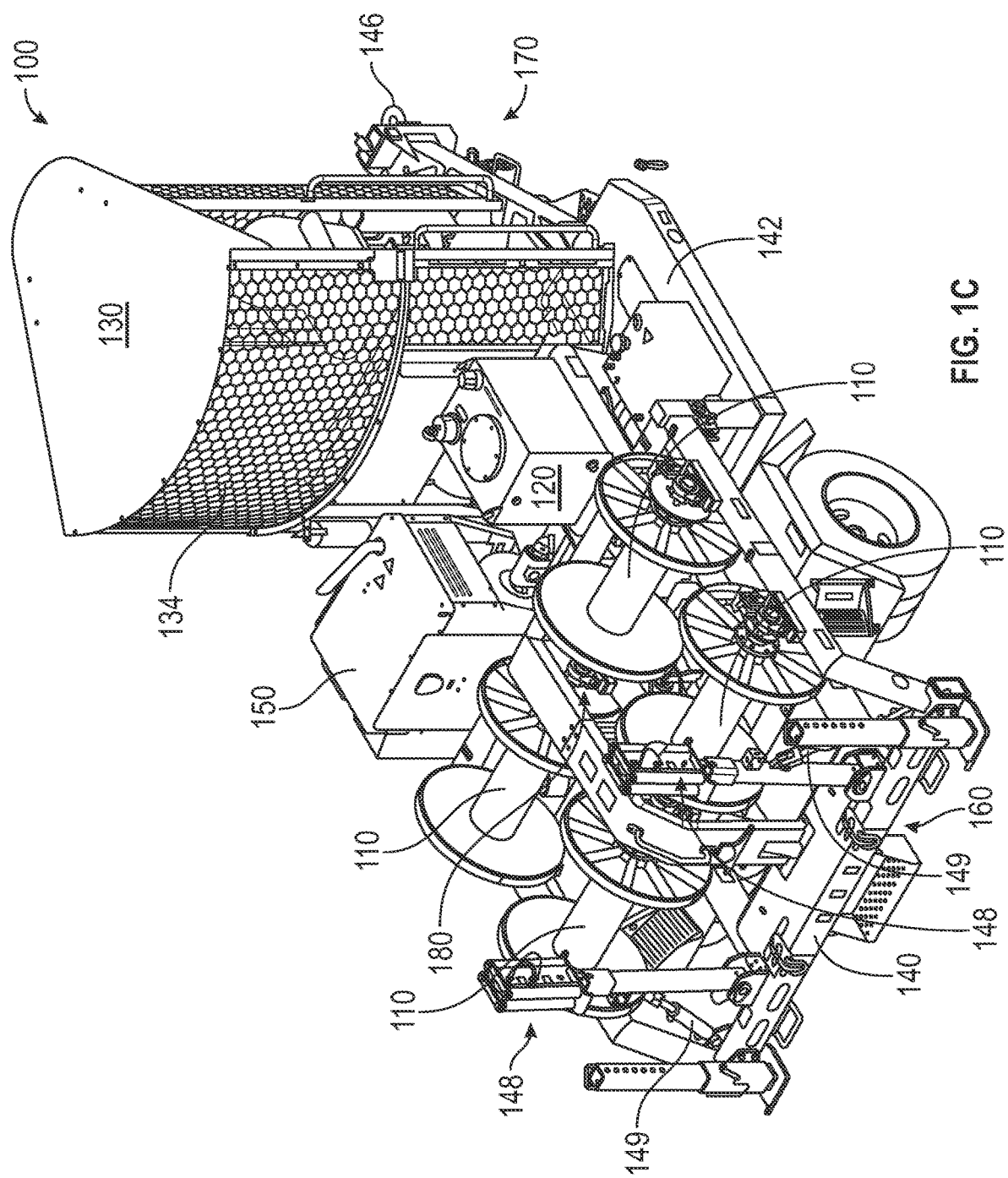
FIG. 1C is a rear, perspective view of an example of a line pulling system, in accordance with some examples of the present disclosure.

Turning now to the drawings in which like references represent like elements, FIG. 1A-C illustrate an improved line pulling system 100 that can comprise one or more line pulling drums 110 (e.g., two or four line pulling drums 110), a hydraulic system 120, and an operator station 130. The line pulling system 100 can further comprise a chassis 140 to support some or all of the components discussed herein, and the line pulling system 100 can also have a motor 150 to power some, or all, of the components discussed herein. In some examples, the motor 150 can be configured to cause the line pulling drum 110 to be rotated in a first direction to receive the line and in a second direction to facilitate removal of the line from the one or more line pulling drums 110.

As shown, each line pulling drum 110 can be mounted on a first end 160 of the chassis 140 and be configured to receive the line. The line pulling drum 110 can have a driven element (not shown) to transfer power and/or torque from the motor 150 to the line pulling drum 110. In some examples, the driven element can be mounted in a central position on the line pulling drum. The motor 150 can have complementary one or more driving elements (not shown), shaped to interface with one or more driven elements, and one or more coupling rings 187 (shown and discussed in more detail below, with reference to FIGS. 2D, 2F, 2H, 2I) to connect the one or more driving elements to the one or more driven elements. The one or more coupling rings 187 can be fitted around the one or more driving elements. In some examples, the one or more coupling rings 187 can have a first uncoupled state in which the one or more coupling rings 187 are not in contact with the one or more line pulling drums 110 and a second coupled state in which the one or more coupling rings 187 is in contact with the one or more driven elements, coupling the motor 150 to the one or more line pulling drums 110.

As shown, the operator station 130 of the line pulling system 100 may include a control console 400 (described in more detail below with reference to FIG. 4) located at the second end 170 of the line pulling system 100 and fastened to a platform 142 of the chassis 140. The control console 400 may include one or more joysticks 152 for controlling the motor's 150 engagement of each line pulling drum 110.

Figure 3A:
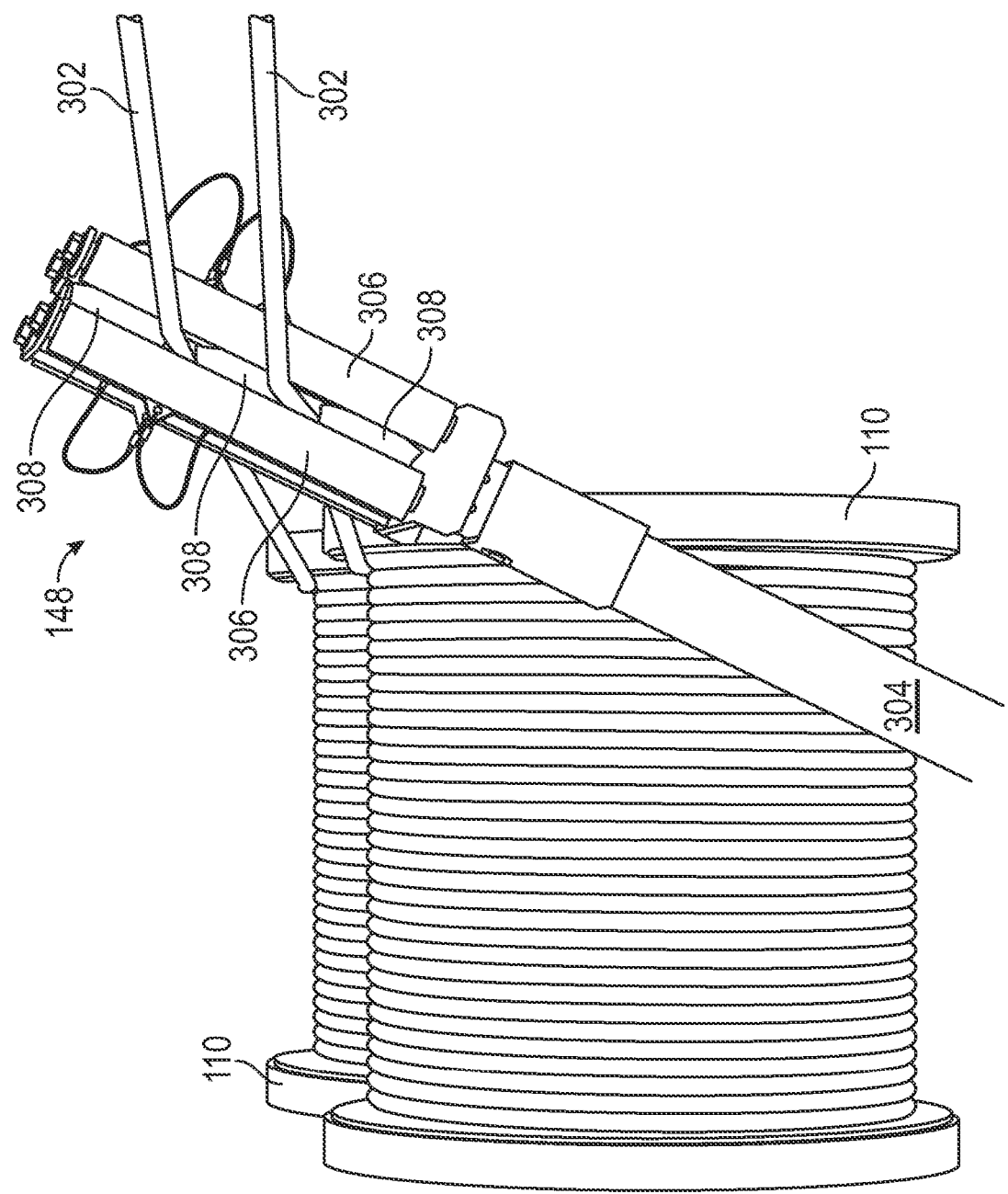
FIG. 3A is a front, perspective view of an example of a level wind, in accordance with some examples of the present disclosure.
Figure 3B:
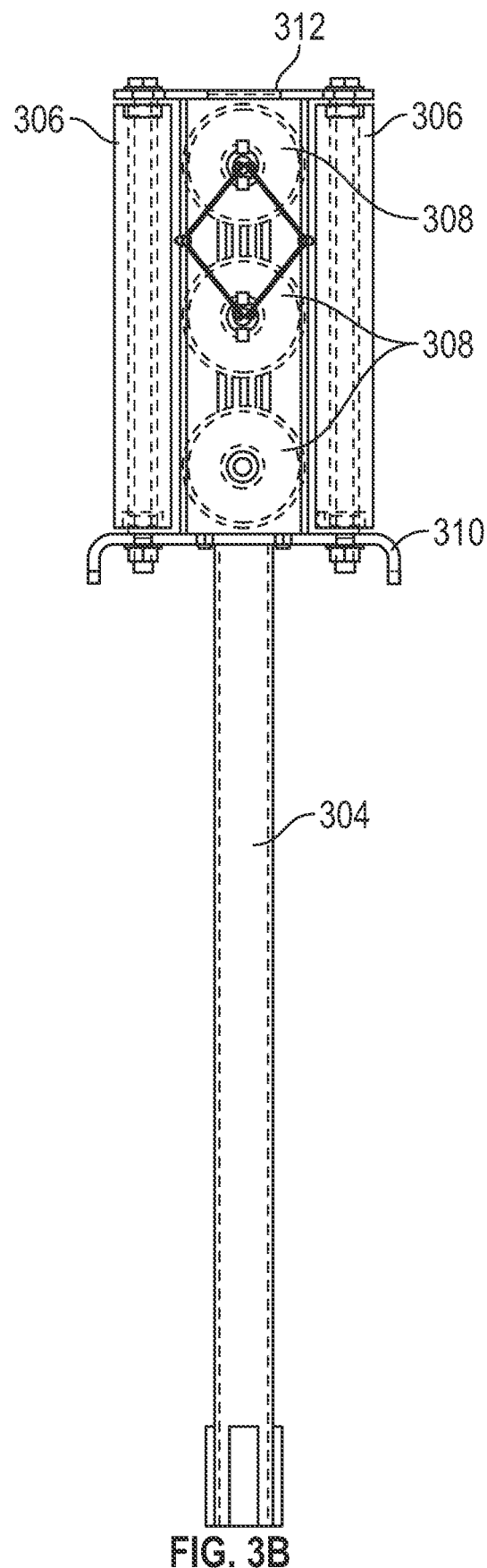
FIG. 3B is a side view of an example of a level wind, in accordance with some examples of the present disclosure.
Figure 3C:
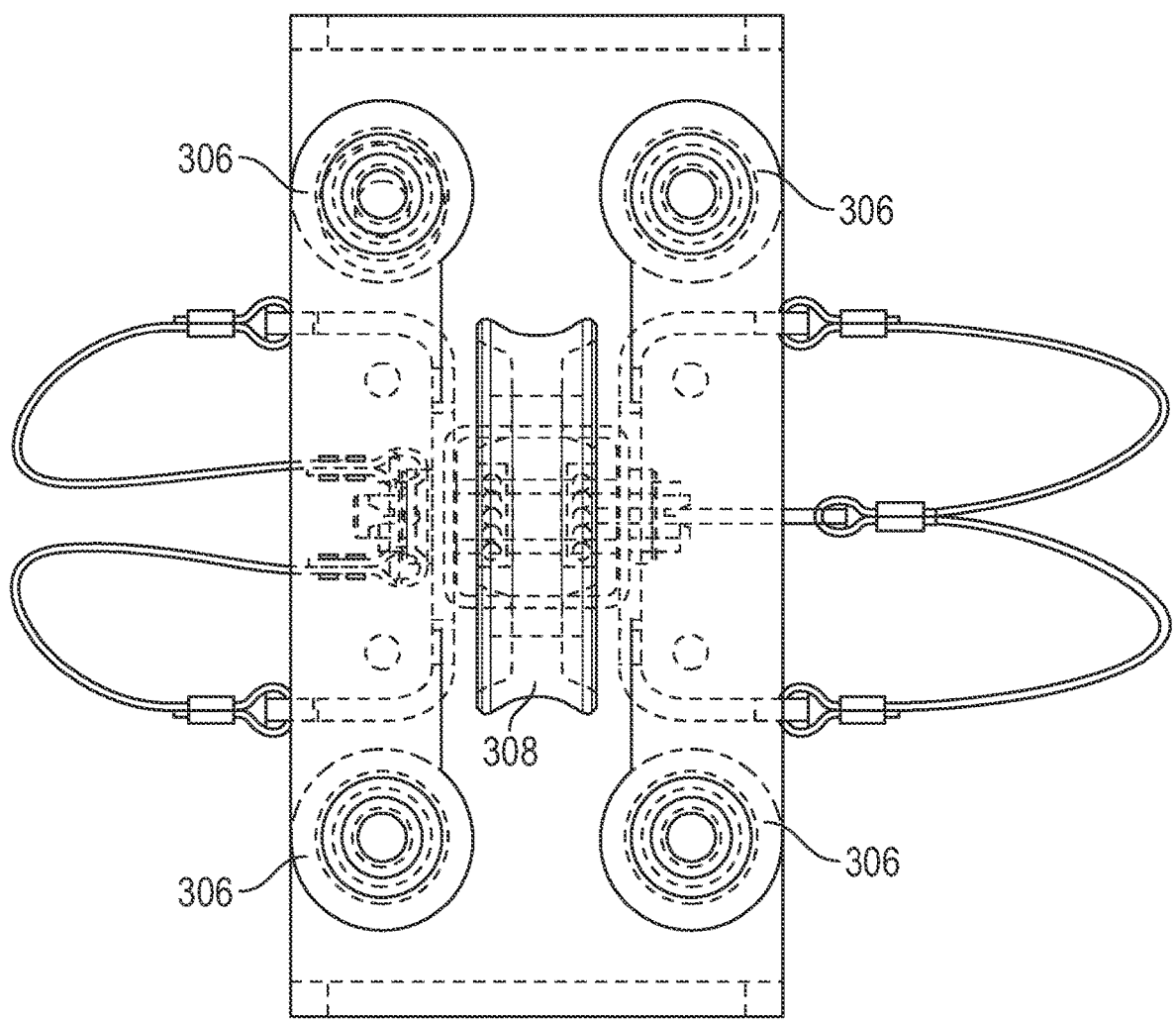
FIG. 3C is a top view of an example of a level wind, in accordance with some examples of the present disclosure.

Also as shown, the line pulling system 100 may also include one or more level wind heads 148 connected to the chassis 140 and respective hydraulic arms 149. As will be described more fully with respect to FIGS. 3A, 3B, and 3C, each level wind head 148 is configured to guide two or more lines to wind or unwind from two or more line pulling drums 110.

Figure 2A:
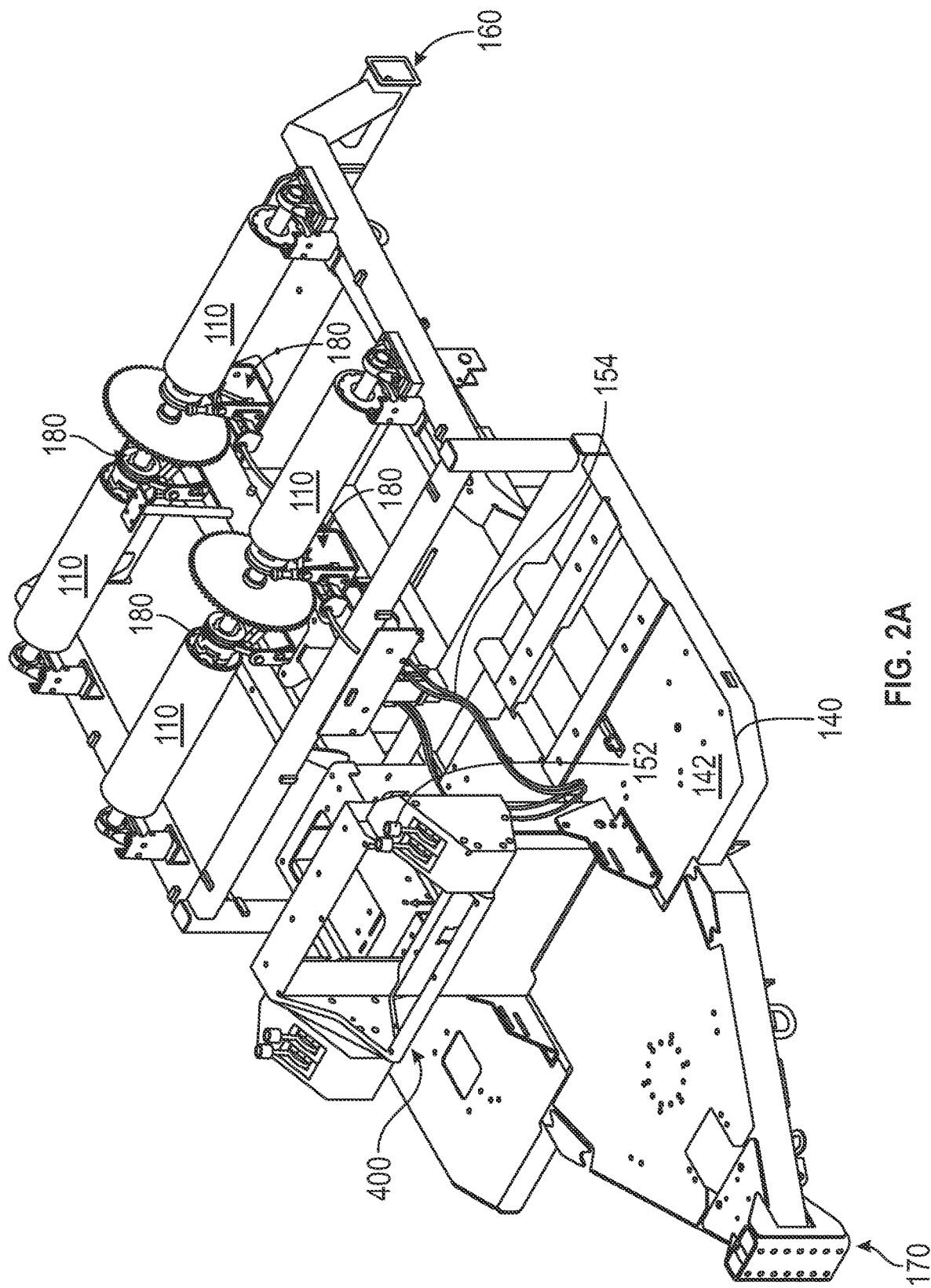
FIG. 2A is a front first side internal, perspective view of an example of a line pulling system, in accordance with some examples of the present disclosure.
Figure 2B:
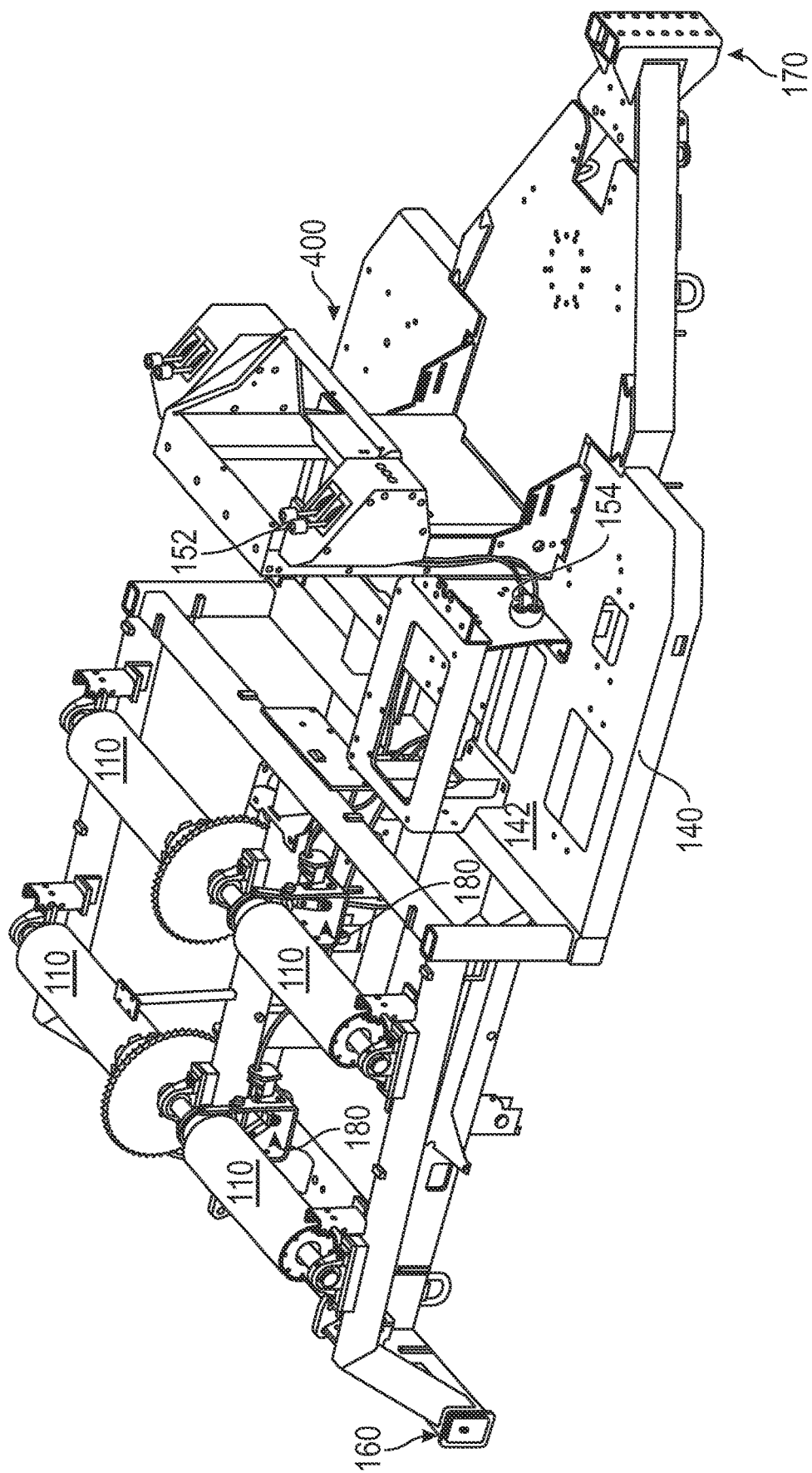
FIG. 2B is a front second side internal, perspective view of an example of a line pulling system, in accordance with some examples of the present disclosure.
Figure 2C:
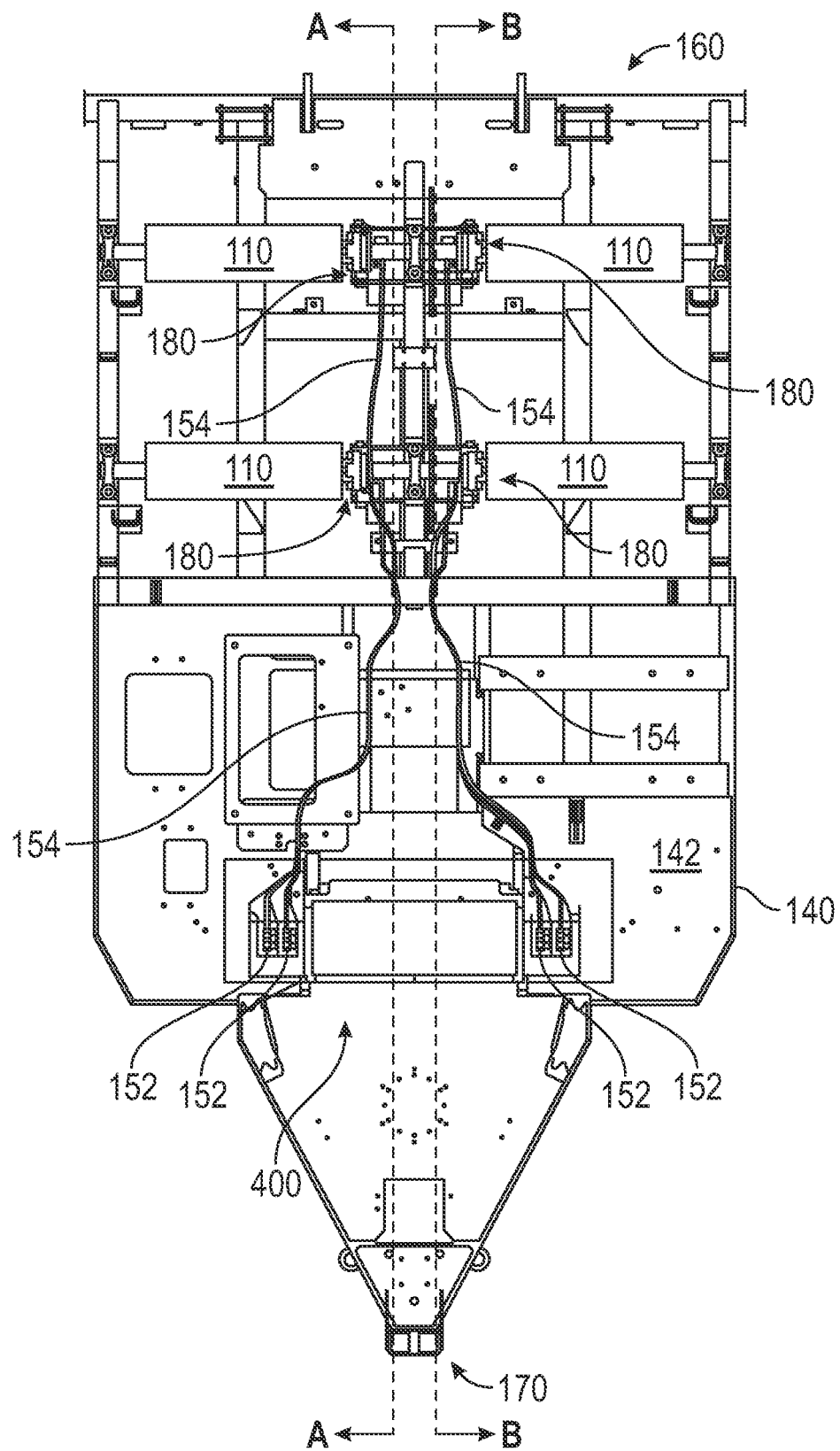
FIG. 2C is an internal top view of an example of a line pulling system, in accordance with some examples of the present disclosure.
Figure 2D:
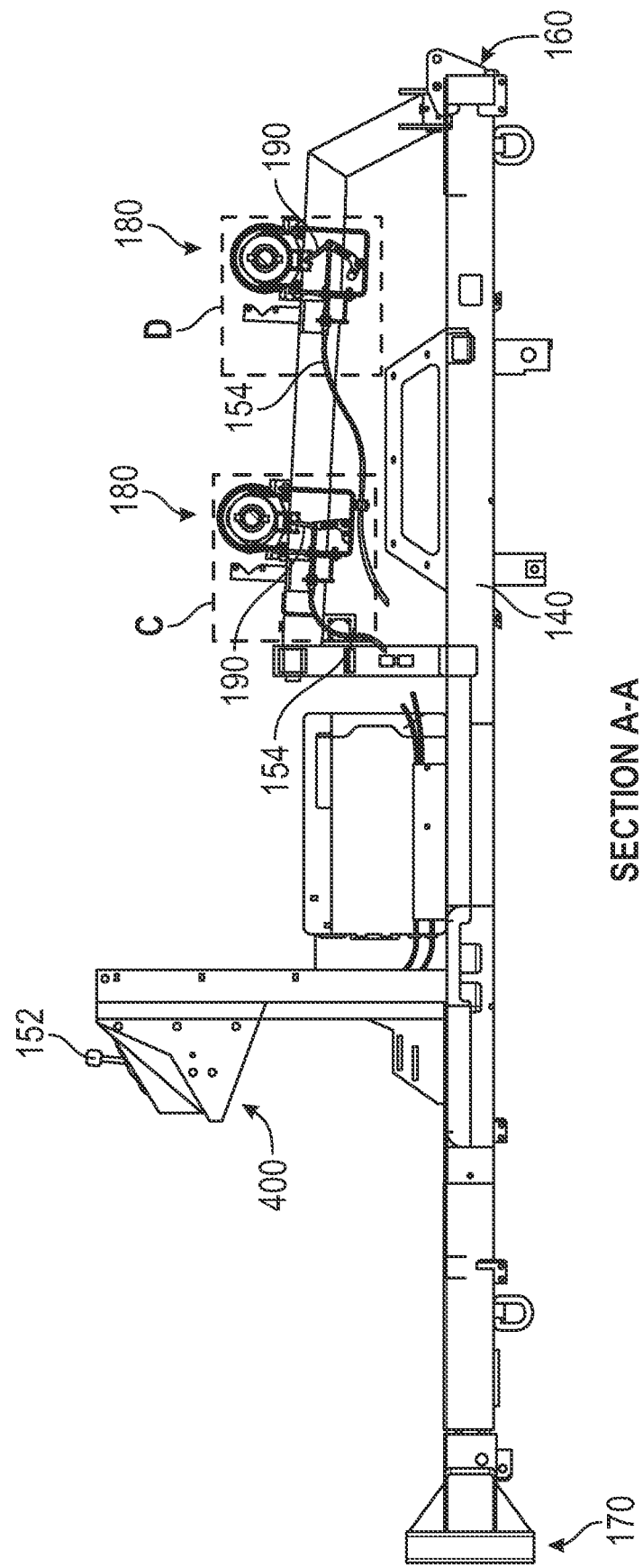
FIG. 2D is a cut-away side view of FIG. 2C along line A-A.
Figure 2E:
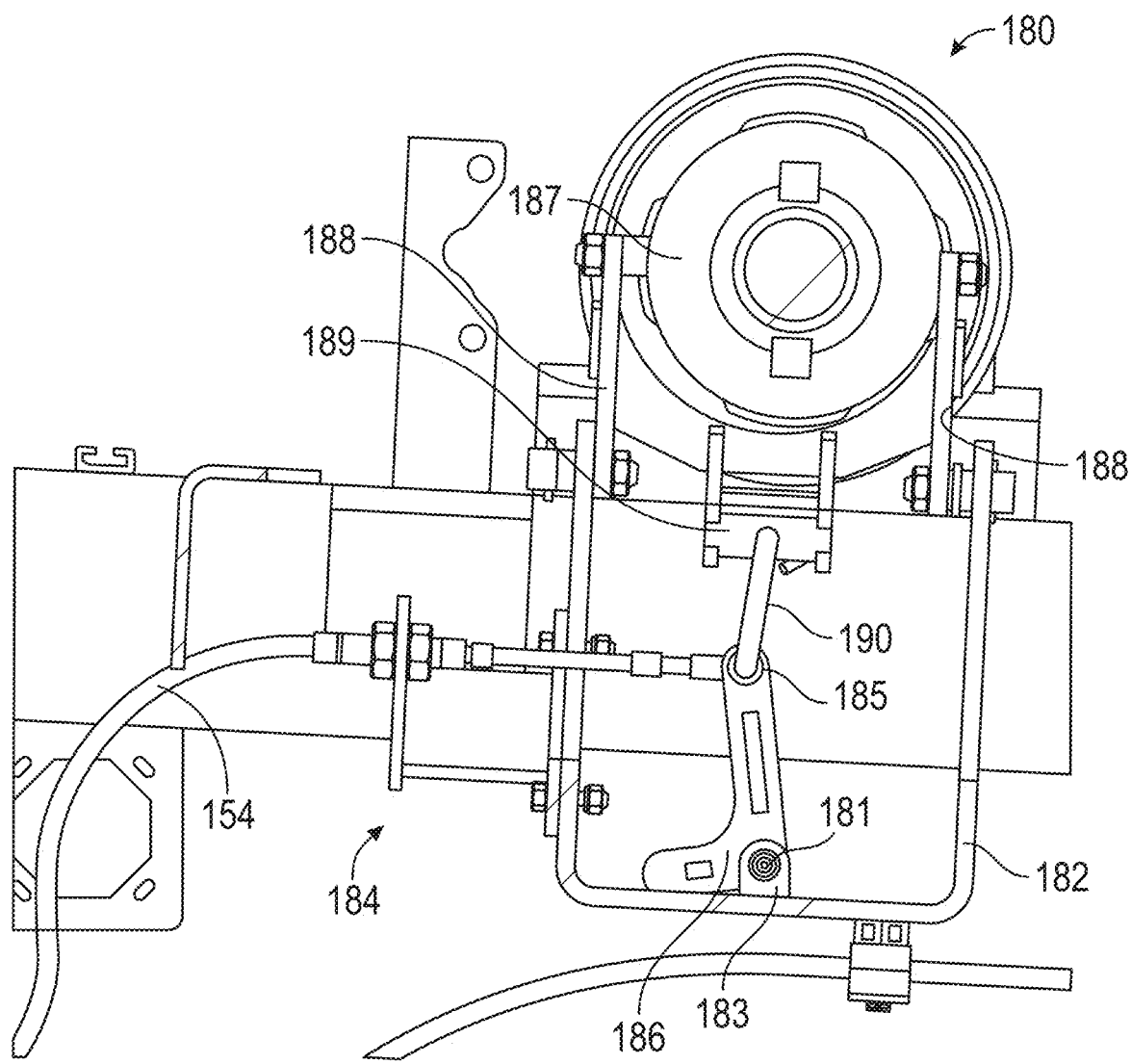
FIG. 2E is an enlarged side view of a portion of FIG. 2D showing detail C.
Figure 2F:
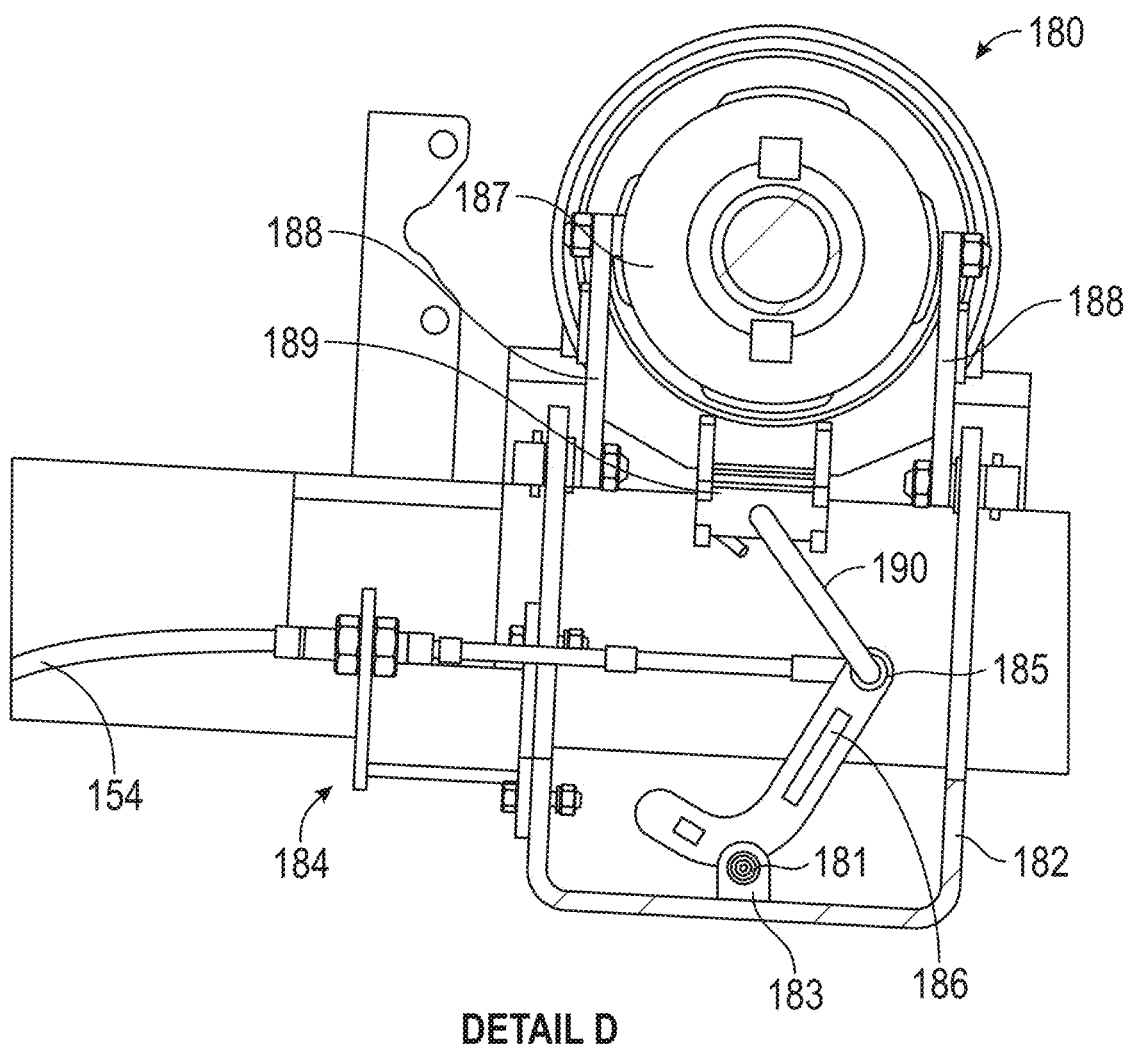
FIG. 2F is an enlarged side view of a portion of FIG. 2D showing detail D.
Figure 2G:
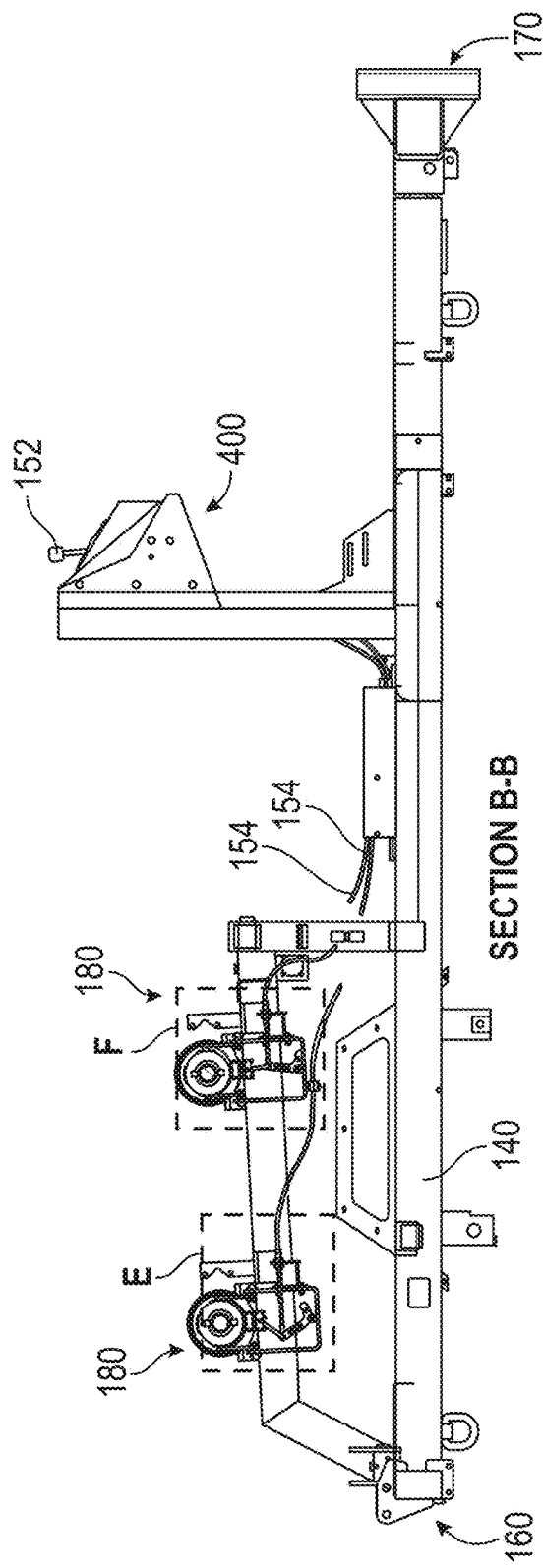
FIG. 2G is a cut-away side view of FIG. 2C along line B-B.
Figure 2I:
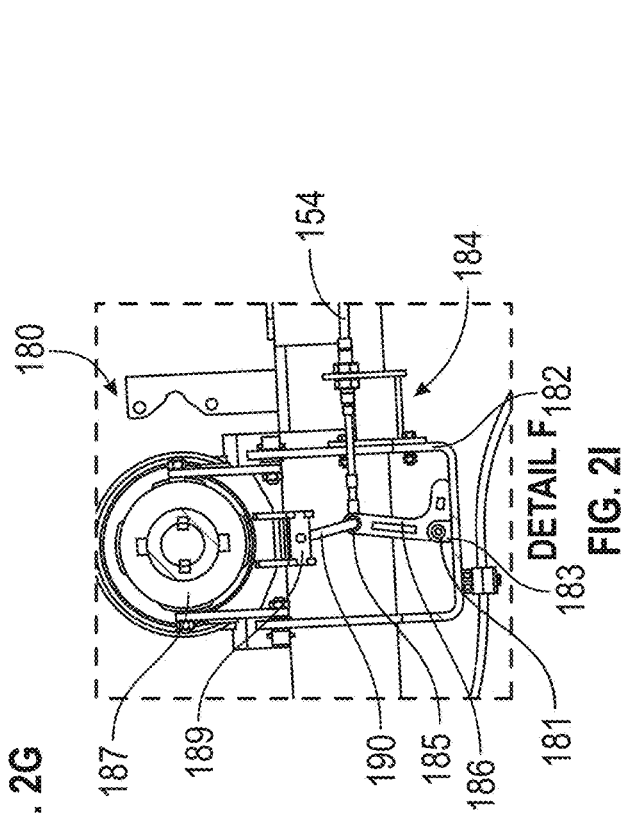
FIG. 2I is an enlarged side view of a portion of FIG. 2G showing detail F.
Figure 2H:
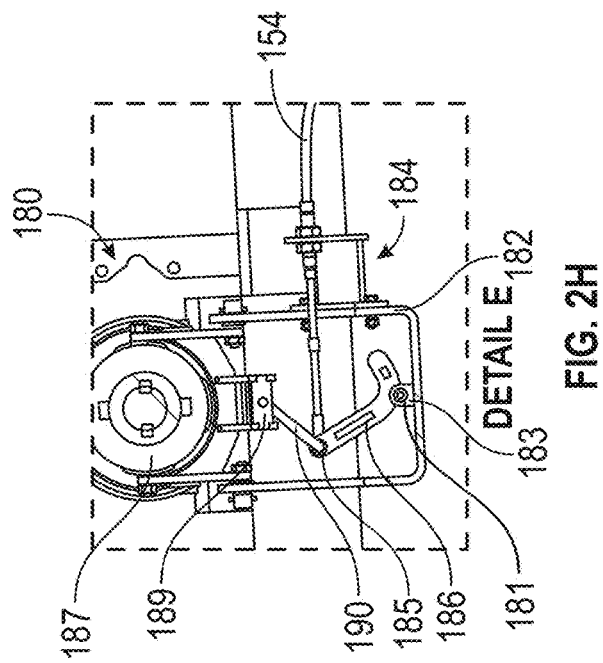
FIG. 2H is an enlarged side view of a portion of FIG. 2G showing detail E.
Figure 2J:
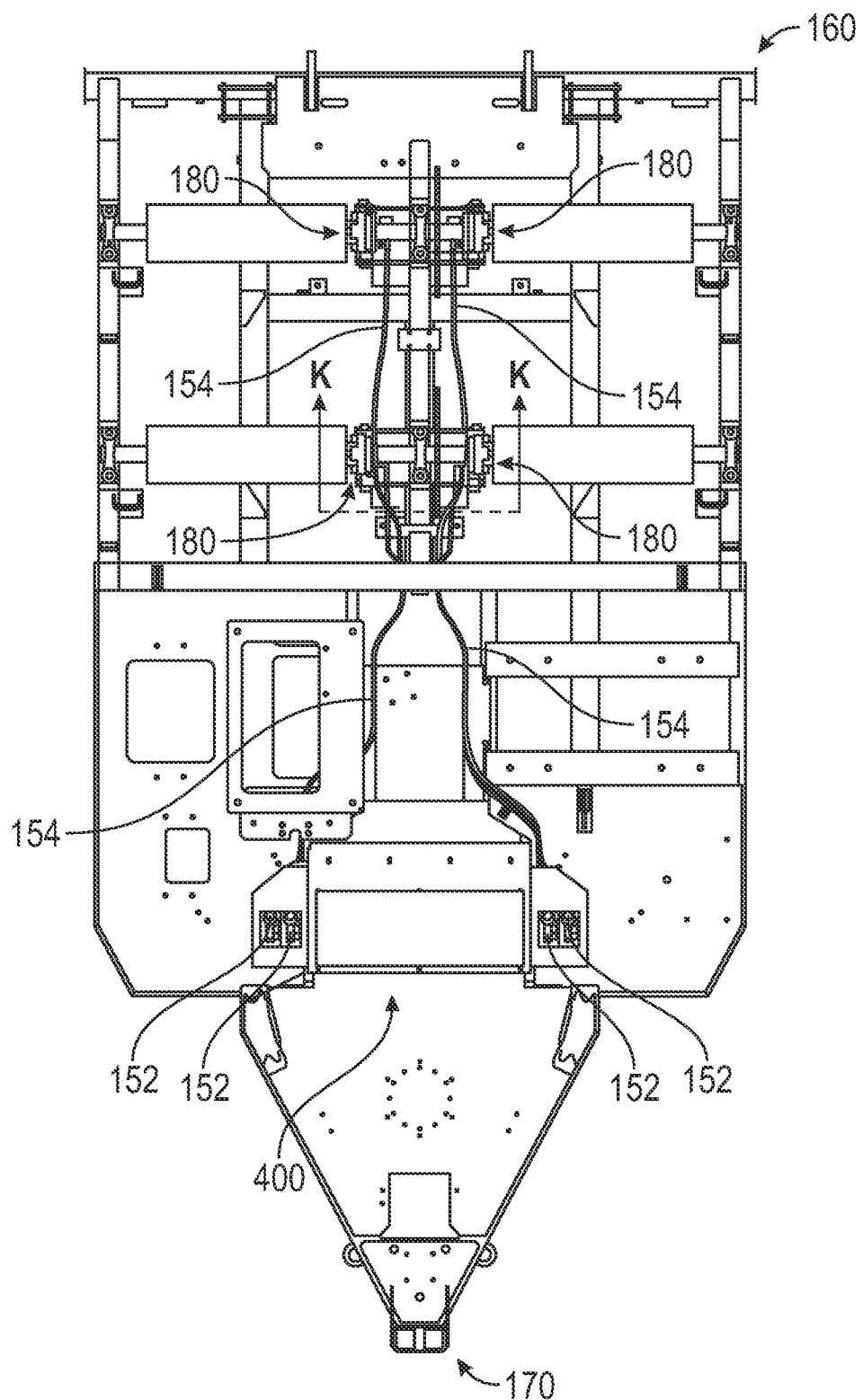
FIG. 2J is an internal top view of an example of a line pulling system, in accordance with some examples of the present disclosure.

As shown in FIGS. 2A-2K line pulling system 100 may also include one or more engagement assemblies 180 located near the first end 160 of the chassis 140. The engagement assemblies may include a portion of the engagement cable 154 running from an engagement lever 152 in the control panel 400. The one or more engagement assemblies 180 may include a support member 182 that may be approximately U-shaped and connected to the engagement cable via an engagement cable assembly 184. The support member 182 may include a first hinge mating piece 183 at approximately the center of an internal bottom portion of the support member 182. The first hinge mating piece 183 may be configured to receive and rotationally mate with a corresponding mating piece of a hinged linkage 186 at a joint 181. The hinged linkage 186 may be L-shaped and connected with the first hinge mating piece 183 at an exterior corner of the L at a first end of the hinged linkage 186. As shown in FIGS. 2H and 2I, the hinged linkage 186 may be connected to the engagement cable 154 at a second end (e.g., the top of the L) opposite the first end. The hinged linkage 186 may also be rotatably connected with a first end of an engagement arm 190 at the second end of the hinged linkage 186 at a joint 185. The engagement arm 190 may be rotatably connected to a coupling ring 187 via an alignment arm 189 extending from the coupling ring 187 to align approximately vertically over an approximate center of the first hinge mating piece 183 but off center the joined ends of the hinged linkage 186 and the engagement arm 190.

As shown in FIGS. 2H and 2I, depending on the position of a corresponding engagement lever 152 (see e.g., FIG. 2A), the engagement cable 154 may be pushed or pulled in the movement of a corresponding engagement lever 152. For example, as shown in FIG. 2H, an operator may move an engagement lever 152 to the up position which may push a corresponding engagement cable 154 causing the connected hinged linkage 186 and the engagement arm 190 to move into the disengaged position thereby causing the coupling ring 187, connected to the engagement arm 190, to disengage from the corresponding core of a drum 110. When the system is in the disengaged position, the hydraulic system is unable to transfer power to rotate the drum 110. Put another way, the first end of the engagement arm 190 and the first end of the hinged linkage 186 may be positioned off center the coupling ring 187 proximate a first end of the line pulling system 160 when in the disengaged position. For example, as shown in FIG. 2I, an operator may move an engagement lever 152 to the down position which may pull a corresponding engagement cable 154 thereby causing the connected hinged linkage 186 and engagement arm 190 to move into the engaged position thereby causing the coupling ring 187, connected to the engagement arm 190, to engage from the corresponding core of a drum 110. Put another way, the first end of the engagement arm 190 and the second end of the hinged linkage 186 may be off centered with the coupling ring 187 proximate the second end 170 when in the engaged position. When the system is in the engaged position, the hydraulic system is able to transfer power to rotate the drum 110

Figure 2K:
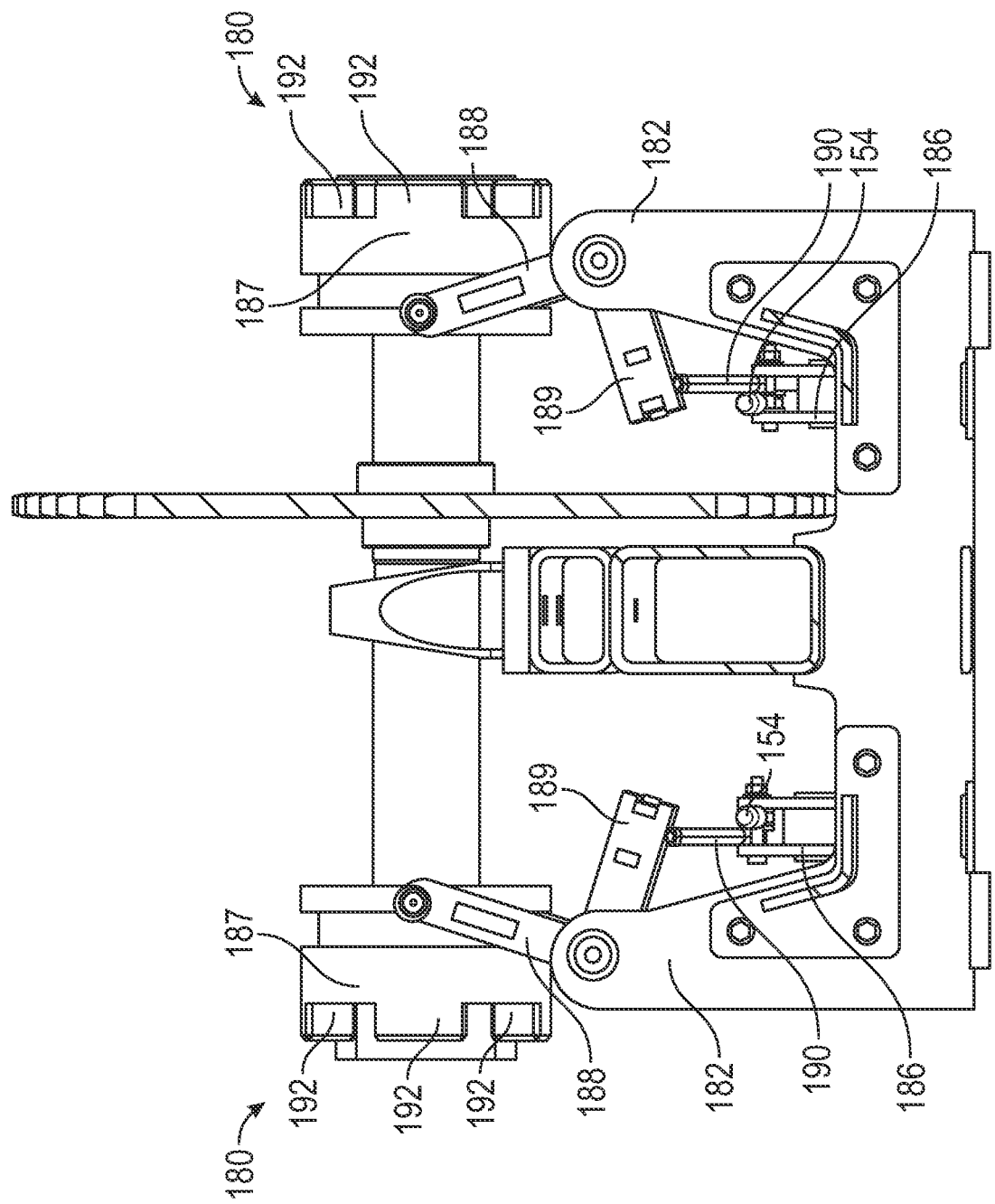
FIG. 2K is a cut-away side view of FIG. 2J along line K-K.

As shown in FIGS. 2E, 2F, 2H, 2I, and 2K, the one or more engagement assemblies 180 may include one or more support arms 188 rotatably coupled to sides of the support member 182 and a coupling ring 187. FIG. 2K shows the coupling ring 187 may include a plurality of protrusions 192 configured to engage with corresponding receptacles (not shown) of the core of the drum 110. The protrusions 192 may be positioned radially about the coupling ring 187. The protrusions 192 can have a variety of shapes so long as the protrusions comprise a portion of material raised and extended outward from the coupling ring 187. For example, the protrusions 192 can be any shape such as involute splines, a polygon of any number of sides, or smooth shapes such as an oval. The size of the protrusions 192 can depend on the torque requirements and the spatial constraints of the containing assembly. In general, a smaller size can be better for manufacturing cost, while a larger size is better for torque transfer. Alternatively, the one or more coupling rings 187 may include receptacles instead of protrusions which correspond with protrusions (not shown) on the core of the drums 110.

The core of the drum 110 can comprise receptacles that correspond to the protrusions 192. In such a manner, the coupling ring 187 can slide within the core of the drum 110. The receptacles can interact with the protrusions 192 and the protrusions 192 simultaneously so that the coupling ring 187 and the core of the drum 110 are attached. Therefore, when the line pulling drum 110 is under tension, the tensioning force can be transferred through the coupling ring 187 such that the coupling ring 187 and the core of the drum 110 are locked together or otherwise in mechanical communication with each other.

The receptacles can be any shape that allows the line pulling drum 110 (and therefore the coupling ring 187) to be in an orientation that is rotated some amount in the direction of torque while engaged and requires that the line pulling drum 110 be rotated some amount in the opposite direction of torque to disengage. The receptacles, for example, can include a cutaway portion that can be recessed and configured to contact the coupling ring 187 when the coupling ring 187 is engaged with the core of the drum 110. The cutaway portion can have a ridge that can contact the coupling ring 187 and prevent the coupling ring 187 from moving to an uncoupled position when force is applied via the coupling ring 187 or when under tension and applying force. In such a manner, the receptacles can create a locking effect. As will be appreciated, the ratio between the rotational displacement and linear displacement to disengage can affect the force required to disengage while the line pulling drum 110 is subjected to a given torque.

Referring back to FIG. 1A-1C, the hydraulic system 120 can also be mounted on the chassis 140. The hydraulic system 120 can include various lines and hoses to transfer hydraulic fluid throughout the line pulling system 100. The hydraulic system 120 can also include other components designed to control hydraulic fluid, such as pistons, valves, metering devices, and the like. In some examples, the hydraulic system 120 can include a manifold (not shown). The manifold can be configured to fluidly communicate with two or more hydraulic lines (not shown) from the hydraulic system and to conduct heat between the two or more hydraulic lines as a heat exchanger. As will be appreciated, however, the manifold is not limited simply to two hydraulic lines.

The operator station 130 can be mounted on the chassis 140. The operator station 130 can have a front safety screen 134 between the operator station 130 and the one or more line pulling drums 110. To further improve the safety of the operator station 130, the operator station can be mounted on the chassis 140 on a second end 170 opposite the first end 160 where the one or more line pulling drums 110 are mounted. The operator station 130 can further comprise a control panel 400 (shown and described in greater detail with respect to FIG. 4) configured to communicate with the motor 150 and/or other components of the line pulling system 100.

As shown in FIGS. 1A-1C, the front safety screen 134 can be curved to increase the protective surface area and to increase the deflection of forces or objects that happen to strike the front safety screen 134. Additionally, the curvature of the front safety screen 134 can be concentric or nearly concentric with the operator's point of view so that the line of sight of the operator can always be perpendicular (or close to perpendicular) to the safety screen. In such a manner, the operator can have a minimally obstructed view through the safety screen. The front safety screen 134 can further comprise a mesh (shown), window, grating, holes, or other suitable design such that the one or more line pulling drums 110 (or other components attached to the chassis 140) are visible through the front safety screen 134. The visual designs (or apertures of the mesh, or grating, etc.) can be sufficiently small in size such that a loose line (or other projectile) is prevented from crossing into the operator station 130 through the front safety screen 134, while an operator is still able to see out of the front safety screen 134. For instance, if a metal grating is used, the spaces between the grating can be small enough to prevent a loose line or other debris from entering the operator station 130 while still remaining large enough to ensure the other components attached to the chassis 140 are visible. Alternatively, the front safety screen 134 can comprise a transparent material, rather than holes or other openings. For example, the front safety screen 134 can comprise a transparent window made from an acrylic or another transparent plastic material.

The front safety screen 134 may additionally have sufficient strength such that the front safety screen is able to withstand forces induced from striking (i.e., from a snapped and/or loose line, with a baseball bat, or crowbar), prying, tearing, cutting (i.e., with a saw), and/or wearing (i.e., with a Dremel or sander). In some examples, the front safety screen 134 can have sufficient strength to withstand forces from flying objects such as rope, conductor, swivels, and grips caused by a line breaking or some portion of a supporting structure breaking.

The front safety screen 134 can also have cutouts or apertures of a specific shape when the front safety screen 134 employs a mesh (as shown). For example, the front safety screen 134 can comprise hexagonal cutouts or apertures. The hexagonal cutouts can break up horizontal and vertical lines so that an operator can better distinguish objects outside the safety screen 134. It is understood that other shapes and patterns of cutouts can be used to create the front safety screen 134 and distinguish the lines of the front safety screen 134 from other lines outside of the front safety screen 134.

Referring to FIGS. 1C and 3A-3C, the line pulling system 100 may include one or more level wind heads 148 configured to guide two or more lines 302 on or off drums 110. The one or more level wind heads 148 can also be attached to the hydraulic system 120 and/or in communication with the control panel 400. The one or more level wind heads 148 can be configured to move laterally with respect to the line pulling drum 110 by one or more level wind hydraulic arms 149 to ensure that any lines being pulled will be evenly distributed around the line pulling drum 110. The one or more level wind heads 148 can have two or more windows through which two lines 302 can pass on its way to the line pulling drum 110. The windows can ensure that the line is retained by the one or more level wind heads 148, and the window can have rollers or other friction-reducing devices to ensure that the line can pass smoothly through the window. In some examples, the one or more level wind heads 148 can also be powered by the hydraulic system 120 and moved via hydraulic arm 149.

The one or more level wind heads 148 may define the two or more window with three or more spaced apart rotating sheaves 308. For example, the space between the bottom and middle sheaves 308 may define a first window for a first line 302 to guide to a first drum 110 and the space between the middle and top sheaves 308 may define a second window for a second line 302 to a second drum 110 located behind the first drum 110. The one or more level wind heads 148 may also include one or more sets of side rollers 306 configured to prevent lines 302 from moving outside of the windows in the approximately horizontal direction. The one or more side rollers 306 may be approximately parallel with a shaft 304 of the level wind head 148 and may be attached to a top brace 312 and a bottom brace 310. Four side rollers 306 may be used to prevent lines 302 from moving off of the sheaves 308. Each sheave 308 may include a curved surface around a circumference of the sheave 308 configures to partially surround a portion of a corresponding line 302.

As is apparent, using level wind head 148, operators may choose to pull more than line at a time, dramatically reducing time in operation on the job. The level wind head 148 is hydraulically synchronized with the drum 110 while the operator may be safely positioned behind safety screen 134. The level wind head 148 allows operators to be able to properly lay rope in a uniform manner back onto the drum 110 eliminating the possibility during the pulling operation for the ropes to become crossed. Using the control panel 400, the operator can activate one of three modes; curb or street side level wind arms or synchronize both. When two level wind heads 148 are synchronized, they move at the same rate from an inner position to an outer position or an outer position to an inner position. Internal valves of the hydraulic system 120 maintain synchronous motion between for the two level wind heads 148.

Figure 4:
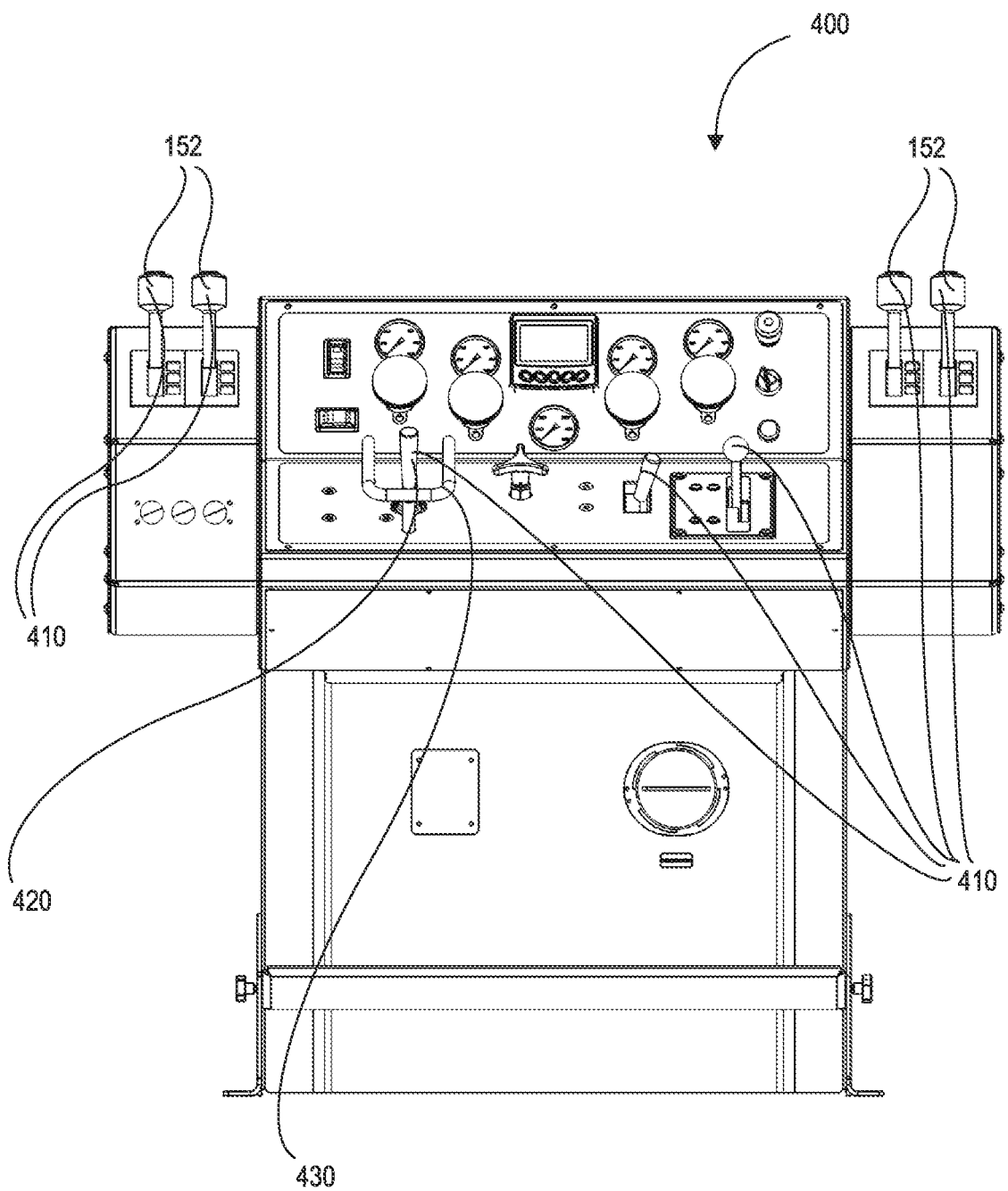
FIG. 4 is a top perspective view of a control panel in an operator station used in a line pulling system, in accordance with some examples of the present disclosure.

As shown in FIG. 4, the control panel 400 can have one or more controls 410 connected to one or more components of the line pulling system 100. The one or more controls 410 can also be in electrical communication with one another and/or the other components of the line pulling system 100. For example, the one or more controls 410 can include an on/off switch for the hydraulic system 120. In some examples, the one or more controls 410 can also be mechanically coupled to each other and/or the components of the line pulling system 100. As shown in FIG. 4, the one or more controls 810 can include one or more joysticks 420 for controlling the line pulling drum 110 and/or level wind head 148 (described below). The joysticks 420 can be mechanically coupled (e.g., via cables, lines, pulleys, and the like) to the hydraulic system 120, one or more line pulling drums 110, and the like. In order to increase user comfort, the control panel 132 can include one or more hand rests 430 disposed proximal to any of the one or more controls 410, as shown in FIG. 4.

As shown in FIG. 4, the hand rest 430 can be configured in a curved shape to partially or substantially surround any of the one or more controls 410, such as joystick 420. The hand rest 430 can have one or more attachment points to fasten the hand rest 430 to the control panel 400. The attachment points can ensure that the hand rest 430 remains in place even after enduring a long life of use and wear-and-tear.

The hand rest 430 can also allow an operator to use the joystick 420 (or any other controls from the one or more controls 410) for longer periods of time and with greater precision. Having the hand rest 430 for control can enable an operator to stabilize their arm and utilize their grip, rather than arm and shoulder muscles, to actuate the controls. The hand rest 430 can also allow an operator to make more accurate movements.

Referring again to FIG. 1A-1C, the chassis 140 can be any form of frame, subframe, trailer, platform, and the like capable of supporting one or more components of the line pulling system 100. The chassis 140 can have a platform 142 to allow an operator to walk or move between the various components of the line pulling system 100. The chassis 140 can also be mounted on top of wheels 144 to allow the line pulling system 100 to be moveable. Any number of wheels can be used, such as two (e.g., if the chassis is a trailer), three, four, or more. In some examples, if the chassis 140 has only two wheels 144 (or multiple wheels on a single axle) or less and requires additional support, the chassis 140 can include a hitch 146 to attach the chassis 140 to a truck, car, trailer mount, jack stand, or other device that can provide stabilization to the chassis 140.

The motor 150 can be any suitable motor to power one or more components of the line pulling system 100 (such as the one or more line pulling drums 110), and the motor 150 can be powered by the hydraulic system 120. The motor 150 can be any motor suitable to transfer power from the hydraulic system 120 to the line pulling drum 110. The hydraulic system 120 can be powered by an engine, such as a diesel motor. Other types of engines can be used, such as gasoline, electric, hybrid, and the like. The engine can include various lines and connections to allow the engine to power the various components of the line pulling system 100, including the hydraulic system 120. The engine can also be connected to a fuel tank, or other energy storage device (e.g., a battery), to provide power to the engine.

The motor 150 can be mounted on the chassis 140 proximal to the line pulling drum 110 and/or the hydraulic system 120, such as on the platform 142. The engine, powering the hydraulic system 120, can be external to the chassis 140, such as a portable generator. In some examples, if the engine is external to the chassis 140, the chassis 140 can have mounting points to store the engine when not in use.

While several possible examples are disclosed above, examples of the present disclosure are not so limited. For instance, while the system is discussed above with reference to suspending power or communications lines, the system could also be used in many other industries such as transportation (e.g., towing, cables cars, street cars, and trains); rope for climbing, rigging, and boundaries; and virtually any other types of lines that need to be strung and/or suspended. In addition, while various features are disclosed, other designs could be used. Such changes are intended to be embraced within the scope of this disclosure. The presently disclosed examples, therefore, are considered in all respects to be illustrative and not restrictive.

What is claimed is:
1. A line pulling system, comprising:
 a chassis configured to support one or more drums, the one or more drums being configured to receive one or more lines;

a motor configured to rotate the one or more drums in a first direction to cause the one or more lines to wind around the one or more drums and in a second direction to facilitate removal of the one or more lines from the one or more drums;

one or more engagement assemblies; and a control console comprising one or more engagement levers configured to control the one or more engagement assemblies, each engagement assembly of the one or more engagement assemblies comprising:

a support member;

an engagement cable configured to be pushed or pulled in response to movement from an engagement lever of the one or more engagement levers;

a hinged linkage rotatably connected to the support member and in mechanical communication with the engagement cable, the hinged linkage configured to partially rotate with respect to the support member in response to a push or pull of the engagement cable;

an engagement arm rotatably connected to the hinged linkage and configured to move in response to the rotational motion of the hinged linkage;

a coupling ring in mechanical communication with the engagement arm and configured to transition between an engaged position and a disengaged position;

a first joint defined by a connection between the hinged linkage and the engagement arm;

a second joint defined by a connection between the hinged linkage and the support member;

wherein, when in the engaged position:

the first joint is positioned a first distance away in a first direction from a line extending between a center of the coupling ring and the second joint, the coupling ring is configured to couple the motor to a drum of the one or more drums to cause a torque applied by the motor to be transferred to the drum, and wherein, when in the disengaged position:

the first joint is positioned a second distance away in a second direction from the line, the second direction being opposite the first direction and the second distance being greater than the first distance, and the coupling ring is configured to uncouple the motor from the drum.

2. The line pulling system of claim 1, wherein the hinged linkage is hinged at a first end connected to the support member and a second end connected to the engagement arm.

3. The line pulling system of claim 1, wherein the engagement arm is hinged at a first end connected to the hinged linkage and a second end connected to the coupling ring.

4. The line pulling system of claim 1, wherein the coupling ring further comprises one or more protrusions configured to connect with one or more corresponding receptacles of the drum when in the engaged position.

5. The line pulling system of claim 1, wherein each engagement assembly further comprises one or more support arms coupled to sides of the support member and the coupling ring and configured to align the coupling ring with the drum.

6. The line pulling system of claim 5, wherein the one or more support arms are hinged with respect to the support member and the coupling ring.

7. A line pulling system, comprising:

a first drum configured to receive a first line;

a second drum configured to receive a second line;

a chassis configured to support the first drum and the second drum;

a motor configured to rotate the first drum and the second drum in a first direction to cause the first line and the second line to wind around the first drum and the second drum and in a second direction to facilitate removal of the first line and the second line from the first drum and the second drum;

a level wind head;

one or more engagement assemblies, each comprising:

a support member;

an engagement cable configured to be pushed or pulled;

a hinged linkage rotatably connected to the support member and in mechanical communication with the engagement cable, the hinged linkage configured to partially rotate with respect to the support member in response to a push or pull of the engagement cable;

an engagement arm rotatably connected to the hinged linkage and configured to move in response to the rotational motion of the hinged linkage;

a coupling ring in mechanical communication with the engagement arm and configured to transition between an engaged position and a disengaged position;

a first joint defined by a connection between the hinged linkage and the engagement arm;

a second joint defined by a connection between the hinged linkage and the support member;

wherein, when in the engaged position:

the first joint is positioned a first distance away in a first direction from a line extending between a center of the coupling ring and the second joint, the coupling ring is configured to couple the motor to one of the first drum or the second drum to cause a torque applied by the motor to be transferred to the one of the first drum or the second drum, and wherein, when in the disengaged position:

the first joint is positioned a second distance away in a second direction from the line, the second direction being opposite the first direction and the second distance being greater than the first distance, and the coupling ring is configured to uncouple the motor from the one of the first drum or the second drum;

the level wind head comprising:

a level wind support connected to the chassis;

a first sheave connected to the level wind support and configured to guide the first line to and from the first drum by the first sheave rotating about a first axis;

a second sheave connected to the level wind support and configured to guide the second line to and from the second drum separate from the first line by the second sheave rotating about a second axis different from the first axis; and a first roller and a second roller each connected to the level wind support and positioned proximate the first sheave and the second sheave, the first roller configured to rotate about a third axis and the second roller configured to rotate about a fourth axis, the third axis and the fourth axis each being approximately orthogonal to the first axis and the second axis; and a hydraulic arm connected to the level wind head and the chassis and configured to move the level wind head approximately laterally as the first line and the second line are wound around the first drum and the second drum, respectively.

8. The line pulling system of claim 7, further comprising:

a control console configured to:

set the one or more engagement assemblies into the engaged position and the disengaged position; and move the hydraulic arm.

9. The line pulling system of claim 7, further comprising:

one or more support arms coupled to sides of the support member and the coupling ring and configured to align the coupling ring with the one of the first drum or the second drum, wherein the one or more support arms are hinged with respect to the support member and the coupling ring, and wherein the coupling ring comprises an alignment arm connected to the engagement arm and configured to be located over a center of a first end of the hinged linkage when in the engaged position.

10. The line pulling system of claim 7, wherein the level wind head comprises a third sheave connected to the level wind support and configured to guide at least one of the first line and the second line to and from the first drum or the second drum, respectively, by the third sheave rotating about a fifth axis different from the first axis and the second axis.

* * * * *